Patented Apr. 29, 1952

2,594,381

UNITED STATES PATENT OFFICE 2,594,381

4-QUINAZOLINE SULFENAMIDES

Adolph J. Beber, Copley, Ohio, assignor to The B. F. Goodrich Company, New York, N. Y., a corporation of New York No Drawing. Application September 29, 1949, Serial No. 118,728

2 Claims. (Cl. 260—256.5)

This invention relates to new chemical compounds and more specifically relates to certain derivatives of 4-mercapto quinazoline.

The compounds of this invention are derivatives of 4-mercapto quinazoline having the generic formula

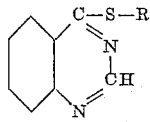

where R is an organic radical containing only atoms of carbon, hydrogen and at least one other element of the group consisting of oxygen, sulfur and nitrogen, and having its connecting valence (the valence through which the radical R is linked to the sulfur atom of the 4-thio-quinazolyl radical) on an atom of the group consisting of carbon, sulfur and nitrogen atoms.

Typical compounds within this class of derivatives of 4-mercapto quinazoline are grouped herein in three groups, depending on the nature of the atom through which the radical R is connected to the sulfur of the 4-thio-quinazolyl radical, as follows:

Group I, compounds wherein the R radical has its connecting valence on carbon.
Group II, compounds wherein the R radical has its connecting valence on sulfur.
Group III, compounds wherein the R radical has its connecting valence on nitrogen.

In the following description of the invention illustrative compounds within each group and their method of preparation will be set forth.

GROUP I COMPOUNDS

Compounds in Group I are further classified, depending on the nature of the R radical, into two types:

*Type A.*—Compounds of this type are those in which the R radical in the above formula is one which forms esters with acid radicals, that is, a radical of the kind connected to a functional OH group in an alcohol or phenol. Such compounds are, of course, esters of 4-mercapto quinazoline, which is acidic. Many such esters are best prepared by reacting the sodium salt of 4-mercapto quinazoline with a compound containing halogen (X) or other radical forming a salt with sodium attached to the ester forming radical in accordance with the equation:

(1) 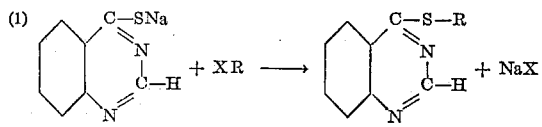

Examples of esters of this type, prepared in this manner and in which the radical R contains only atoms of carbon, hydrogen and at least one other element which is oxygen, sulfur or nitrogen include those in which R is a carboxy, hydroxy, oxy, oxo, thio, thiono, nitro, amino, cyano, or thiocyano substituted hydrocarbon group, representative of which are the following:

4-quinazolyl aminoethyl sulfide
4-quinazolyl nitroethyl sulfide
4-quinazolyl nitrophenyl sulfides
4-quinazolyl dinitrophenyl sulfides
4-quinazolyl hydroxyphenyl sulfides
4-quinazolyl carboxyphenyl sulfides
4-quinazolyl aminophenyl sulfides
Alpha-(4-quinazolyl-thio) acetaldehyde
Beta-(4-quinazolyl-thio) propionic acid
Alpha-(4-quinazolyl-thio) acetamide
Beta-(4-quinazolyl-thio) propionitrile
Alpha-(4-quinazolyl-thio) thiolacetic acid
Alpha-(4-quinazolyl-thio)-beta-mercapto ethane The following example illustrates the preparation of the above-described esters by way of the preparation of the 2,4-dinitrophenyl ester of 4-mercapto quinazoline. In this example all parts are by weight.

*Example I.*—An aqueous solution containing 4.3 parts of sodium hydroxide in 255 parts of water was employed to dissolve 16.2 parts of 4-mercapto quinazoline. To this solution of the sodium salt of 4-mercapto quinazoline there was added during a period of 25 minutes 20.2 parts of 2,4-dinitro-1-chlorobenzene dissolved in 80 parts of ethyl alcohol. The temperature of the aqueous mixture was originally 22° C. but when the mixture was stirred while the 2,4-dinitro-1-chlorobenzene was being added, the temperature increased rapidly. By external cooling the temperature of the reacting mixture was maintained at about 35° C. The reaction mixture was stirred for 2 hours after all the reactants had been combined. After this period, the mixture was heated to 60° C. for 10 minutes, cooled to room temperature and filtered to recover the yellow precipitate which formed during the reaction. The product was washed several times with water and dried. A yield of 90% of a yellow product was recovered and the product was identified as the 2,4-dinitrophenyl ester of 4-mercapto quinazoline. A portion of this ester was recrystallized twice from ethanol and the resulting purified ester had a melting point of 191 to 192° C. By a chemical analysis of the purified ester the percentage composition appearing in the following table was found, which compares favorably with the calculated percentage composition also shown in the following table.

*Percentage composition*

By analysis:
| | |
|---|---|
| Carbon | 50.55 |
| Hydrogen | 2.31 |
| Nitrogen | 15.91 |
| Sulfur | 9.80 |
| Oxygen (by difference) | 21.53 |
| | 100.00 |

Calculated:
| | |
|---|---|
| Carbon | 51.22 |
| Hydrogen | 2.44 |
| Nitrogen | 17.07 |
| Sulfur | 9.75 |
| Oxygen | 19.52 |
| | 100.00 |

It is thus established that the compound of this example has the following structural formula:

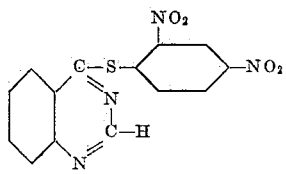

Accordingly, the compound is named 4-quinazolyl o,p-dinitrophenyl sulfide or o,p-dinitrophenyl-4-thio-quinazoline. Other nitroaryl esters of 4-mercapto quinazoline including the o-m- or p-mono-nitrophenyl esters, the other various dinitrophenyl esters, the trinitrophenyl esters, nitrotolyl and nitronaphthyl esters, are similar yellow crystalline compounds which are prepared in an entirely similar manner starting with the sodium salt of 4-mercapto quinazoline and the appropriate chloro and nitro substituted aryl hydrocarbon.

Esters of this type A also result from the reaction of 4-mercapto quinazoline with an amine and an aldehyde such as formaldehyde (in which case the products are amino-methyl esters), acetaldehyde or the like. Specific examples of amino-methyl esters of 4-mercapto quinazoline (more conveniently named as 4 - quinazolyl aminomethyl sulfides) are the following:

4-quinazolyl aminomethyl sulfide
4-quinazolyl N-diethylaminomethyl sulfide
4-quinazolyl N-diisopropyl-aminomethyl sulfide
4-quinazolyl N-paratolyl-aminomethyl sulfide
4-quinazolyl N-diorthotolyl-aminomethyl sulfide
4-quinazolyl N-anilinomethyl sulfide
4-quinazolyl N-diphenyl-aminomethyl sulfide
4-quinazolyl N-beta-naphthyl-aminomethyl sulfide
4-quinazolyl N-benzyl-aminomethyl sulfide
4-quinazolyl N-cyclohexyl-aminomethyl sulfide
4-quinazolyl N - cyclopentamethylene - aminomethyl sulfide
4-quinazolyl N - ethylene - oxy - ethylene-aminomethyl sulfide
4-quinazolyl N - ethylene - thio-ethylene-aminomethyl sulfide
N,N'-(quinazolyl-thio-methylene)-para- diamino benzene The following are examples of the preparation of representative aminomethyl esters of 4-mercapto quinazoline. Here also the parts are by weight.

*Example II.*—4-quinazolyl ortho-tolyl-aminomethyl sulfide was prepared in the following manner. To a stirred mixture containing 200 ml. of water, 40 g. of a 50% NaOH solution, 41 g. of formalin (37% CH2O) and 81 g. of 4-mercapto quinazoline at 10° C. to 15° C. there was added 300 ml. of a solution of ortho toluidine hydrochloride, prepared by adding 49.2 g. of 37% hydrochloric acid to 53.5 g. of ortho toluidine. This resulting mixture was stirred and maintained at room temperature for 2 hours during which time a yellow precipitate formed. This yellow precipitate was recovered by filtration, washed with cold water and dried. In this manner, 105 g. of the desired product was recovered. This derivative of 4-mercapto quinazoline was yellow and without any purification had a melting point range of 220° to 250° C. This compound was found to have the following structural formula:

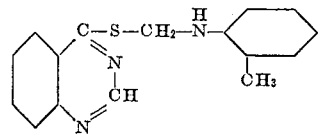

*Example III.*—An aqueous solution containing 20 g. of sodium hydroxide in 200 ml. of water was employed to form an aqueous solution of the sodium salt of 81 g. of 4-mercapto quinazoline. To this aqueous solution of the sodium salt of 4-mercapto quinazoline there was added 41 g. of formalin (37% CH2O) and the resulting mixture was stirred while an aqueous solution of paraphenylene diamine hydrochloride prepared by the addition of 49.2 g. of hydrochloric acid (37% HCl) to 27 g. of para-phenylene diamine and diluting to 300 ml. This reaction mixture was stirred for 2 hours at room temperature during which time a precipitate formed. This resulting slurry was filtered to recover the precipitate. The recovered precipitate was washed with water and dried. The dried product identified as N,N'-(quinazolyl-thio-methylene) para-diamino benzene, weighed 98 g., a yield of 86%, and had a melting point of 247° C. to 250° C. This compound is believed to have the following structural formula:

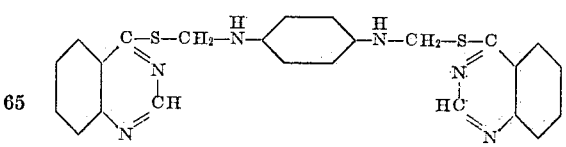

*Type B.*—Compounds of this type are those in which the R radical in the above generic formula is an acidyl radical, that is, a radical derived by removing the OH group from a carboxylic acid, or the SH group from a thio acid or other compound which reacts as an acid by reason of its containing an acidic —SH group. Compounds of this type include those in which the radical R is represented by the following structures in each of which R' represents hydrogen or a hydrocarbon group or a substituted hydrocarbon group (provided of course that the substituent contains only atoms of the elements in the class consisting of carbon, hydrogen, oxygen, sulfur and nitrogen) and R'' represents a bivalent hydrocarbon or substituted hydrocarbon group.

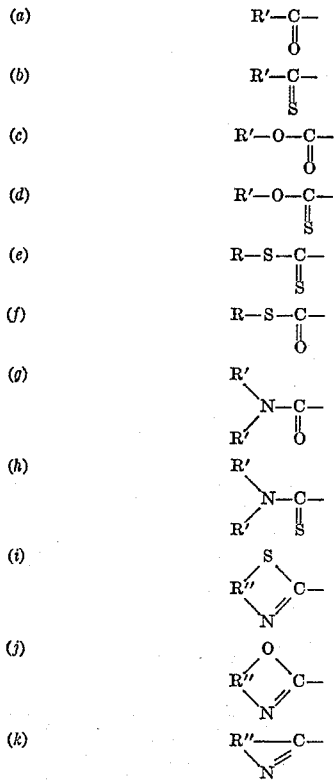

Compounds of this type are made, in general, by the same reaction set forth in Equation 1 hereinabove, that is by reacting the sodium salt of 4-mercapto quinazoline with the appropriate acid halide (R—X) or, in the case of those compounds in which R is derived from a compound containing an acidic —SH group, by reacting the acidic —SH compound with 4-chloro-quinazoline in accordance with the equation:

(2)
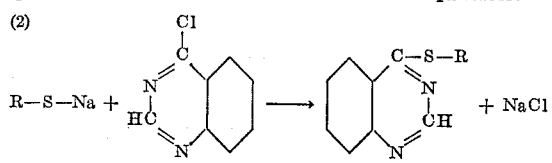

Typical examples of specific compounds of this type include the following:

4-quinazolyl benzoyl sulfide
4-quinazolyl thiobenzoyl sulfide
4-quinazolyl acetyl sulfide
4-quinazolyl butyryl sulfide
4-quinazolyl phthaloyl sulfide
Bis(4-quinazolyl-thio) ketone
Bis(4-quinazolyl-thio) thione
4-quinazolyl 2-thiazyl sulfide
4-quinazolyl 2-oxazyl sulfide
4-quinazolyl 4,5-dimethyl-thiazyl-2-sulfide
4-quinazolyl 2-benzothiazyl-sulfide
4-quinazolyl nitrobenzothiazyl-2-sulfide
4-quinazolyl 4-methyl-5-phenyl-oxazyl-2-sulfide
4-quinazolyl 2-quinolyl sulfide
4-quinazolyl 2-thiodiazyl sulfide
4-quinazolyl 4,4,6-trimethyl-thiazinyl-2-sulfide
4-quinazolyl 4,4-dimethyl-oxazolyl-2-sulfide
4-quinazolyl-xanthogenyl sulfide
4-quinazolyl dimethylcarbamyl sulfide
4-quinazolyl dimethylthiocarbamyl sulfide The following is an example of the preparation of type B esters of 4-mercapto quinazoline just described. The parts herein are also by weight.

*Example IV.*—The compound 4-quinazolyl-thio-allyl carbonate was prepared by dissolving 46 g. of the anhydrous sodium salt of 4-mercapto quinazoline in 300 ml. of ethanol. While this solution was stirred, 31 g. of allyl chloro-carbonate were added slowly causing the temperature of the reaction mixture to rise from about 30° C. to 40° C. The reacting materials were then heated to 80° C. for one hour while a yellow precipitate formed. This resulting slurry was stirred until it cooled to room temperature. The yellow precipitate was recovered by filtration, washed with ethanol and dried. The resulting dry yellow solid, the desired product, weighed 28 g. and had a melting point above 320° C. This compound was found to have the following structural formula:

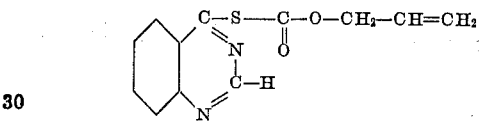

In a like manner similar compounds wherein the allyl radical is replaced by an alkyl radical such as methyl, ethyl or butyl or a phenyl radical or other hydrocarbon radical are also made from the sodium salt of 4-mercapto quinazoline and the appropriate chloro-carbonate.

GROUP II COMPOUNDS

Compounds of this group, as hereinbefore defined, are those wherein the R radical in the above generic formula has its connecting valence on sulfur. Such compounds include, disulfides, trisulfides and tetrasulfides. The disulfide of 4-mercapto quinazoline is prepared, for example, by oxidizing the sodium salt of 4-mercapto quinazoline in an aqueous solution. Mixed disulfides can be prepared by oxidizing equimolecular portions of the sodium salt of 4-mercapto quinazoline and the sodium salt of a R—SH compound in aqueous solution. Tetra sulfides can be best prepared by reacting the disulfides with chlorine to form two moles of sulfuryl chloride and then reacting the sulfuryl chlorides with sodium disulfide to form the tetrasulfide and two moles of sodium chloride. This preparation can be represented by the following equations:

(3a)

(3b)
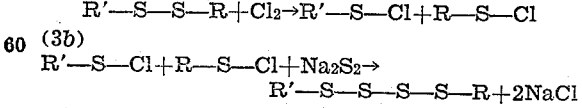

In the above equation R' represents the quinazolyl radical.

Another method commonly employed to prepare tetrasulfides is to react the sodium salts of the mercapto compounds with $S_2Cl_2$. Two moles of sodium chloride are also formed as a by-product in this reaction as indicated in the following equation:

(4)
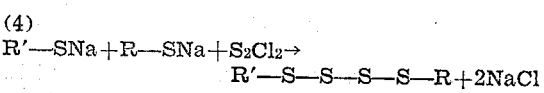

(R' is the quinazolyl radical)

One method by which the trisulfides can be conveniently prepared is by reacting SCl₂ with the sodium salt of 4-mercapto quinazoline or with a mixture containing the sodium salt of 4-mercapto quinazoline and the sodium salt of the R—SH compound. The reaction takes place according to the following equation where R' is the quinazolyl radical:

(5)
R'—SNa+R—S—Na+SCl₂→
R'—S—S—S—R+2NaCl

Examples of di-, tri- and tetrasulfides which can be prepared as above described and which contain the radical R composed only of carbon, hydrogen and at least one other element which is oxygen, sulfur or nitrogen include the following:

Bis(4-quinazolyl) di-, tri- and tetrasulfides
4-quinazolyl 2-thiazyl di-, tri- and tetrasulfides
4-quinazolyl 4,5-dimethyl-thiazyl-2- di-, tri- and tetrasulfides
4-quinazolyl 2-benzothiazyl di-, tri- and tetrasulfides
4-quinazolyl-nitrobenzothiazyl-2 di-, tri- and tetrasulfides
4-quinazolyl-hydroxybenzothiazyl-2 di-, tri- and tetrasulfides
4-quinazolyl 4-methyl - 5 - phenyl-oxazyl-2- di-, tri- and tetrasulfides
4-quinazolyl benzo-oxazyl-2 di-, tri- and tetrasulfides
4-quinazolyl para-nitrophenyl di-, tri- and tetrasulfides
4-quinazolyl thiocarbamyl di-, tri- and tetrasulfides
4-quinazolyl dimethylthiocarbamyl di-, tri- and tetrasulfides
4-quinazolyl phenylthiocarbamyl di-, tri- and tetrasulfides
4-quinazolyl N(cyclo-pentamethylene) thiocarbamyl di-, tri- and tetrasulfides
4 - quinazolyl N(cyclo - ethylene - oxy-ethylene) thiocarbamyl di-, tri- and tetrasulfides
4 - quinazolyl N(cyclo - ethylene - thio-ethylene) thiocarbamyl di-, tri- and tetrasulfides
4-quinazolyl cyclohexyl thiocarbamyl di-, tri- and tetrasulfides
4-quinazolyl 2-quinolyl di-, tri- and tetrasulfides
4-quinazolyl 2-thiodiazolyl di- and tetrasulfides
4-quinazolyl 4,4,6-trimethyl thiazinyl-2 di-, tri- and tetrasulfides
4-quinazolyl 2-thiazinyl di-, tri- and tetrasulfides
4 - quinazolyl 4 - ethyl-5-butyl-oxazolinyl-2 di-, tri- and tetrasulfides
4-quinazolyl isopropyl xanthogen di-, tri- and tetrasulfides
4-quinazolyl-para-nitrophenyl disulfide
4-quinazolyl-ortho, para-dinitrophenyl disulfide The disulfide of 4-mercapto quinazoline is readily prepared by oxidation of 4-mercapto quinazoline but not all methods of oxidation which are usually employed in forming disulfides from mercapto compounds can be employed with equal success to form this disulfide. For example, hypochlorites such as sodium hypochlorite, which are commonly employed to oxidize thiazoles to their corresponding disulfides, are of no practical use in the oxidation of 4-mercapto quinazoline, for when such oxidizing agent is employed, there is formed 4-oxy quinazoline instead of the disulfide. I have discovered, however, that the disulfide can be formed in excellent yield either by oxidizing 4-mercapto quinazoline with a persulfate in the presence of an alkali metal hydroxide or by oxidizing with chlorine in the presence of a salt of a weak acid and a strong base such as sodium carbonate. The formation of the disulfide is believed to take place according to the following equations:

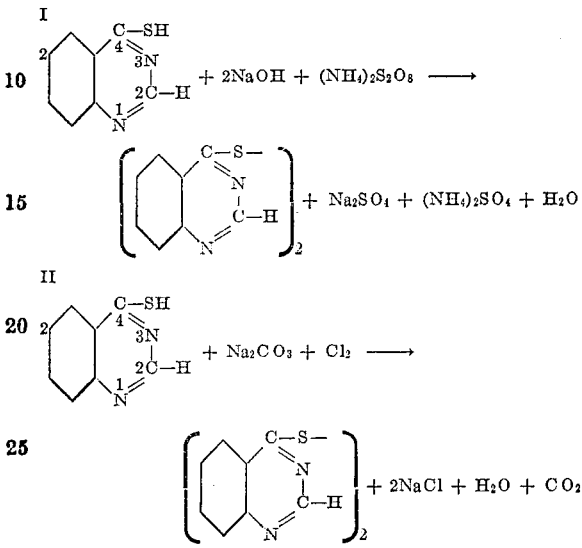

The following are specific examples of the preparation of the disulfide of 4-mercapto quinazoline wherein the parts are by weight.

*Example V.*—An aqueous solution containing 4.6 parts of sodium hydroxide and 250 parts of water was employed to dissolve 16.2 parts of 4-mercapto quinazoline. To this solution there was added slowly over 45 minutes an aqueous solution containing 22.4 parts of sodium persulfate dissolved in 200 parts of water while the reaction mixture was stirred and the temperature was maintained at 18–21° C. During the addition of the persulfate solution a yellow precipitate was formed which was recovered, washed with water and dried. In this manner a 66% yield of the product, identified as the disulfide of 4-mercapto quinazoline having a melting point of 192 to 195° C. was recovered. The unoxidized sodium salt of 4-mercapto quinazoline remained in solution. The percentage compositions of the product and that calculated for such a product are given below. Accordingly, the compound is named bis(4-quinazolyl) disulfide.

*Percentage composition*

|  | Found | Calculated |
| --- | --- | --- |
| Carbon | 59.68 | 59.60 |
| Hydrogen | 3.19 | 3.13 |
| Nitrogen | 17.41 | 17.38 |
| Sulfur | 19.94 | 19.89 |
| Total | 100.22 | 100.00 |

*Example VI.*—An aqueous solution containing 4.6 parts of sodium hydroxide and 105 parts of water was employed to dissolve 16.2 parts of 4-mercapto quinazoline. To this solution was added an aqueous solution containing 5.3 parts of sodium carbonate dissolved in 50 parts of water. The resulting aqueous solution was filtered to remove undissolved materials. The filtered aqueous solution was stirred and heated to 55° C. and maintained at that temperature for 25 minutes while 7.6 parts of chlorine was bubbled through the solution. A yellow precipitate formed as soon as the chlorine was added to the solution. The reaction mixture was stirred one hour after all the chlorine had been added, was cooled to room temperature and was filtered to recover the disulfide precipitate. A yield of 70% of the disulfide having a melting point of 192 to 195° C. was recovered.

GROUP III COMPOUNDS

Compounds of this group, as hereinbefore defined, are those wherein the R radical in the above generic formula has its connecting valence on nitrogen. Such compounds include nitrogenous base salts and sulfenamides.

The nitrogenous base salts, which are amine salts, of 4-mercapto quinazoline can be prepared in the same manner as any amine salt of an organic acid, for as hereinbefore stated, 4-mercapto quinazoline is acidic. The sulfenamide derivatives of 4-mercapto quinazoline can be prepared by oxidizing a mixture of 4-mercapto quinazoline and an amine.

The following are typical compounds of this group where the connecting valence of the R group is on nitrogen and the R group contains only atoms of carbon, hydrogen and at least one other element which is oxygen, sulfur or nitrogen.

Ammonia salt of 4-mercapto quinazoline
Ethylamine salt of 4-mercapto quinazoline
Diethylamine salt of 4-mercapto quinazoline
Unsubstituted guanidine salt of 4-mercapto quinazoline
Diphenyl guanidine salt of 4-mercapto quinazoline
Cyclohexylamine salt of 4-mercapto quinazoline
Piperidine salt of 4-mercapto quinazoline
Morpholine salt of 4-mercapto quinazoline
Ethylene diamine bis(4-mercapto quinazoline) salt
Aniline salt of 4-mercapto quinazoline
Phenylene diamine bis(4-mercapto quinazoline) salt
Triethylamine salt of 4-mercapto quinazoline
N,N'-(thio-4-quinazolyl) urea
N,N'-(thio-4-quinazolyl) thiourea
4-quinazolyl isopropyl sulfenamide
4-quinazolyl benzyl sulfenamide
4-quinazolyl dibenzyl sulfenamide
4-quinazolyl N-benzyl 4-methyl sulfenamide
4-quinazolyl diphenyl sulfenamide
4-quinazolyl di-orthotolyl sulfenamide
4-quinazolyl beta-naphthyl sulfenamide
4-quinazolyl cyclohexyl sulfenamide
4-quinazolyl N-cyclopentamethylene sulfenamide
4-quinazolyl N-cycloethylene-oxy-ethylene sulfenamide
4-quinazolyl N-cycloethylene-thio-ethylene sulfenamide
4-quinazolyl N-cyclotetramethylene sulfenamide
Bis(4-quinazolyl)-ethylene disulfenamide
Tris(4-quinazolyl)-diethylene trisulfenamide
4-quinazolyl 2-hydroxy-ethylene sulfenamide The following example, in which the parts are by weight, illustrates the preparation of compounds of group III where the connecting valence of the R group is through nitrogen.

*Example VII.*—4-quinazolyl diamyl sulfenamide was prepared by first mixing together with stirring 40.5 parts of 4-mercapto quinazoline, 500 parts of water and 39.2 parts of diamyl amine. To this agitated mixture 300 parts of an 8% aqueous solution of NaOCl were added at such a rate that the reaction temperature was maintained at 30° C. to 40° C. When the stirring was stopped, two layers formed, an aqueous layer and an oil layer. This mixture was filtered to remove a small amount of finely-divided solid material and the sulfenamide oil layer was taken up with ether. The ether solution was separated from the aqueous phase, dried over sodium sulfate and the ether was removed by evaporation. 45 parts of residue, the desired sulfenamide, was a dark brown free-flowing oil representing a yield of 57% were recovered.

*Uses of compounds*

The 4-mercapto quinazoline derivatives of this invention are useful for various purposes. They are accelerators for the sulfur vulcanization of natural and synthetic rubbers, many of them being particularly valuable for their "delayed action" effect, as is more fully disclosed in my copending application Serial No. 118,729 filed September 29, 1949, this use being somewhat surprising in view of the fact that organic accelerators usually contain the characteristic grouping

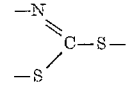

not essentially present in derivatives of 4-mercapto quinazoline. Other uses in the rubber and plastics industry for example as modifying ingredients in the polymerization of conjugated dienes, and as vulcanizing agents for vinyl resins are also suggested by the structures herein set forth. In addition, they are valuable economic poisons and agricultural chemicals, being effective as insecticides, fungicides and bactericides. Those derivatives which possess the 4-quinazolyl-thio radical attached to a carboxy-alkyl radical or to a radical hydrolyzable thereto, such as beta-(4-quinazolyl thio) propionic acid and its amide, are useful as plant growth regulants. Other applications such as in the synthesis of chemicals useful as pharmaceuticals and for other purposes will occur to those skilled in the art.

I claim:

1. 4-Quinazolyl diamyl sulfenamide.
2. A quinazolyl sulfenamide having the structure

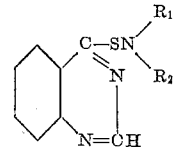

wherein $R_1$ and $R_2$ are alkyl hydrocarbon radicals containing 1 to 8 carbon atoms.

ADOLPH J. BEBER.

REFERENCES CITED

The following references are of record in the file of this patent:

UNITED STATES PATENTS

| Number | Name | Date |
|---|---|---|
| 1,724,086 | Hentrich et al. | Aug. 13, 1929 |